US011591092B2

(12) United States Patent
Horner

(10) Patent No.: US 11,591,092 B2
(45) Date of Patent: Feb. 28, 2023

(54) DISSIMILAR MICROCONTROLLERS FOR OUTFLOW VALVE

(71) Applicant: Honeywell International Inc., Morris Plains, NJ (US)

(72) Inventor: Darrell W. Horner, Oro Valley, AZ (US)

(73) Assignee: Honeywell International Inc., Charlotte, NC (US)

( * ) Notice: Subject to any disclaimer, the term of this patent is extended or adjusted under 35 U.S.C. 154(b) by 599 days.

(21) Appl. No.: 16/361,513

(22) Filed: Mar. 22, 2019

(65) Prior Publication Data

US 2020/0298978 A1   Sep. 24, 2020

(51) Int. Cl.
*B64D 13/04*   (2006.01)

(52) U.S. Cl.
CPC .................... *B64D 13/04* (2013.01)

(58) Field of Classification Search
CPC ...................................... B64D 13/04
USPC ........................................... 454/74
See application file for complete search history.

(56) References Cited

U.S. PATENT DOCUMENTS

| 2,621,577 | A | * | 12/1952 | Cooper | B64D 13/02 417/43 |
| 4,164,895 | A | | 8/1979 | Aldrich et al. | |
| 5,520,578 | A | | 5/1996 | Bloch et al. | |
| 6,737,988 | B2 | | 5/2004 | Horner et al. | |
| 6,979,257 | B2 | | 12/2005 | Horner et al. | |
| 8,808,072 | B2 | | 8/2014 | Horner et al. | |
| 8,864,559 | B2 | | 10/2014 | Horner et al. | |
| 9,783,306 | B2 | | 10/2017 | Horner et al. | |
| 2005/0153648 | A1 | | 7/2005 | Horner et al. | |
| 2006/0019594 | A1 | | 1/2006 | Horner et al. | |
| 2008/0233854 | A1 | | 9/2008 | Horner et al. | |
| 2010/0173575 | A1 | | 7/2010 | Horner et al. | |
| 2017/0083204 | A1 | * | 3/2017 | Kim | G06F 3/04812 |
| 2020/0298979 | A1 | | 9/2020 | Horner et al. | |

OTHER PUBLICATIONS

Response to Extended Search Report dated Aug. 14, 2020, from counterpart European Application No. 20163456.5, filed Oct. 7, 2020, 41 pp.

(Continued)

*Primary Examiner* — Allen R. B. Schult
(74) *Attorney, Agent, or Firm* — Shumaker & Sieffert, P.A.

(57) ABSTRACT

In some examples, a cabin pressure control and monitoring system includes an outflow valve, a first motor configured to operate the outflow valve to release fluid from a cabin, and a second motor configured to operate the outflow valve to release fluid from the cabin. The cabin pressure control and monitoring system also includes a first microcontroller configured to automatically control the first motor based on a pressure of the fluid in the cabin. The cabin pressure control and monitoring system further includes a second microcontroller configured to control the second motor based on user input and monitor the pressure of the fluid in the cabin. In some examples, a type of the first microcontroller is different than a type of the second microcontroller.

11 Claims, 6 Drawing Sheets

(56) References Cited

OTHER PUBLICATIONS

Ping et al., "Failure analysis of aircraft cabin pressure control system," School of Aeronautical Science & Engineering, Beijing University of Aeronautics and Astronautics, IEEE, Applicant points out, in accordance with MPEP 609.04(a), that the year of publication, 2011, is sufficiently earlier than the effective U.S. filing date, so that the particular month of publication is not in issue, 4 pp.
Extended Search Report from counterpart European Application No. 20163456.5, dated Aug. 14, 2020, 11 pp.
Examination Report from counterpart European Application No. 20163456.5, dated Jun. 2, 2021, 8 pp.
U.S. Appl. No. 16/804,843, by Honeywell International Inc. (Inventors: Horner et al.), filed Feb. 28, 2020.
Response to Extended Search Report dated Jun. 2, 2021, from counterpart European Application No. 20163456.5, filed Aug. 23, 2021, 13 pp.
Notice of Intent to Grant and Text Intended to Grant from counterpart European Application No. 20163456.5 dated Sep. 13, 2022, 41 pp.

* cited by examiner

DISSIMILAR MICROCONTROLLERS FOR OUTFLOW VALVE

TECHNICAL FIELD

This disclosure relates to cabin pressure control systems.

BACKGROUND

As an aircraft increases its altitude, the pressure outside of the aircraft decreases. Without control of the flow of air out of the aircraft, excessive amounts of air can leak out of the aircraft cabin causing the cabin to decompress to an undesirably low pressure. Some aircraft are equipped with a cabin pressure control system to maintain the cabin pressure altitude to within a relatively comfortable range (e.g., below approximately 8,000 feet). The cabin pressure system can allow gradual changes in the cabin pressure altitude to keep passengers comfortable and maintain a cabin-to-atmosphere differential pressure below nominal and maximum limits.

The cabin altitude expresses the cabin pressure in terms of an equivalent altitude. For example, a cabin altitude of zero (i.e., sea level) means that the cabin pressure is equal to the atmospheric pressure at sea level, which is approximately 1 bar, 100 kilopascals, or 760 mmHg. A cabin altitude of 5,000 feet means that the cabin pressure is equal to the atmospheric pressure at an altitude of 5,000 feet, which is approximately 0.54 bar, 54 kilopascals, or 410 mmHg.

To maintain aircraft cabin altitude within a relatively comfortable range, cabin pressure control systems are equipped with an outflow valve to regulate air flow out of the cabin. A cabin pressure control system can control the outflow valve using automatic control, manual control by a pilot, and an altitude limit. The altitude limit functionality can override the other means of control to maintain the cabin altitude below a threshold.

To provide redundancy, the cabin pressure control system can include an automatic control subsystem and a manual control subsystem. In some cabin pressure control systems, the manual control subsystem also includes altitude limiting functionality. The pilot can use switches in the cockpit to cause the manual control subsystem to increase or decrease the cabin pressure. In addition, the pilot can use the switches to cause the manual control subsystem to perform a dump operation to quickly lower the cabin pressure.

SUMMARY

In general, this disclosure relates to systems, devices, and techniques for using two dissimilar microcontrollers for controlling the operation of an outflow valve. To minimize the chance of both microcontrollers failing at the same time, a type of the first microcontroller is different than a type of the second microcontroller. The first microcontroller automatically controls a first motor to drive the outflow valve based on a pressure of fluid in a cabin. The second microcontroller controls a second motor to drive the outflow valve based on user input. The second microcontroller also has monitoring functionality for the pressure of the fluid in the cabin, which can also be referred to as altitude limit functionality.

In some examples, a cabin pressure control and monitoring system includes an outflow valve, a first motor configured to operate the outflow valve to release fluid from a cabin, and a second motor configured to operate the outflow valve to release fluid from the cabin. The cabin pressure control and monitoring system also includes a first microcontroller configured to automatically control the first motor based on a pressure of the fluid in the cabin. The cabin pressure control and monitoring system further includes a second microcontroller configured to control the second motor based on user input and monitor the pressure of the fluid in the cabin. In some examples, a type of the first microcontroller is different than a type of the second microcontroller.

In some examples, a method for controlling a pressure of a fluid in a cabin includes automatically controlling, by a first microcontroller and based on the pressure of the fluid in the cabin, a first motor to operate an outflow valve to release the fluid from the cabin. The method further includes controlling, by a second microcontroller and based on user input, a second motor to operate the outflow valve to release fluid from the cabin. The method also includes monitoring, by the second microcontroller, the pressure of the fluid in the cabin, where a type of the first microcontroller is different than a type of the second microcontroller.

In some examples, a cabin pressure control and monitoring system includes an outflow valve, a first motor configured to operate the outflow valve to release fluid from a cabin, and a second motor configured to operate the outflow valve to release fluid from the cabin. The cabin pressure control and monitoring system also includes a first controller configured to automatically control the first motor based on a pressure of the fluid in the cabin. The cabin pressure control and monitoring system further includes a second controller configured to monitor the pressure of the fluid in the cabin, detect that user input indicates manual operation, and determine that the pressure of the fluid in the cabin is less than a threshold level. The second controller is also configured to control the second motor in response to detecting that the user input indicates manual operation, cause the outflow valve to close in response to determining that the pressure of the fluid in the cabin is less than the threshold level, and refrain from controlling the second motor in response to detecting that the user input does not indicate manual operation and in response to determining that the pressure of the fluid in the cabin is not less than the threshold level.

The details of one or more examples of the disclosure are set forth in the accompanying drawings and the description below. Other features, objects, and advantages will be apparent from the description, drawings, and claims.

DETAILED DESCRIPTION

A pressure vessel such as an aircraft cabin may contain fluid (e.g., air) at a different pressure than the fluid outside of the pressure vessel. To maintain or increase the cabin pressure, the cabin receives compressed fluid (e.g., bleed air of a turbine engine). To maintain or reduce the cabin pressure, the cabin can release fluid through an outflow valve. A cabin pressure control and monitoring system can include two motors, where each motor is able to open or close the outflow valve. The cabin pressure control and monitoring system includes two microcontrollers, where each microcontroller controls one of the motors.

This disclosure describes techniques for improving the operation and resiliency of the microcontrollers of a cabin pressure control and monitoring system. These techniques include using dissimilar microcontrollers for controlling the two motors and using separate power sources for the two microcontrollers. Moreover, a microcontroller may be able to control a motor at different speeds that are programmable and/or based on a mode of operation. In addition, a microcontroller can include built-in test logic for testing the microcontroller, testing the input/output signals received or generated by the microcontroller, testing a power supply, and/or testing a pressure sensor. The techniques of this disclosure can help with detecting a failure in the cabin pressure control and monitoring system and can reduce the likelihood that the failure will affect the performance of the system.

Figure 1:
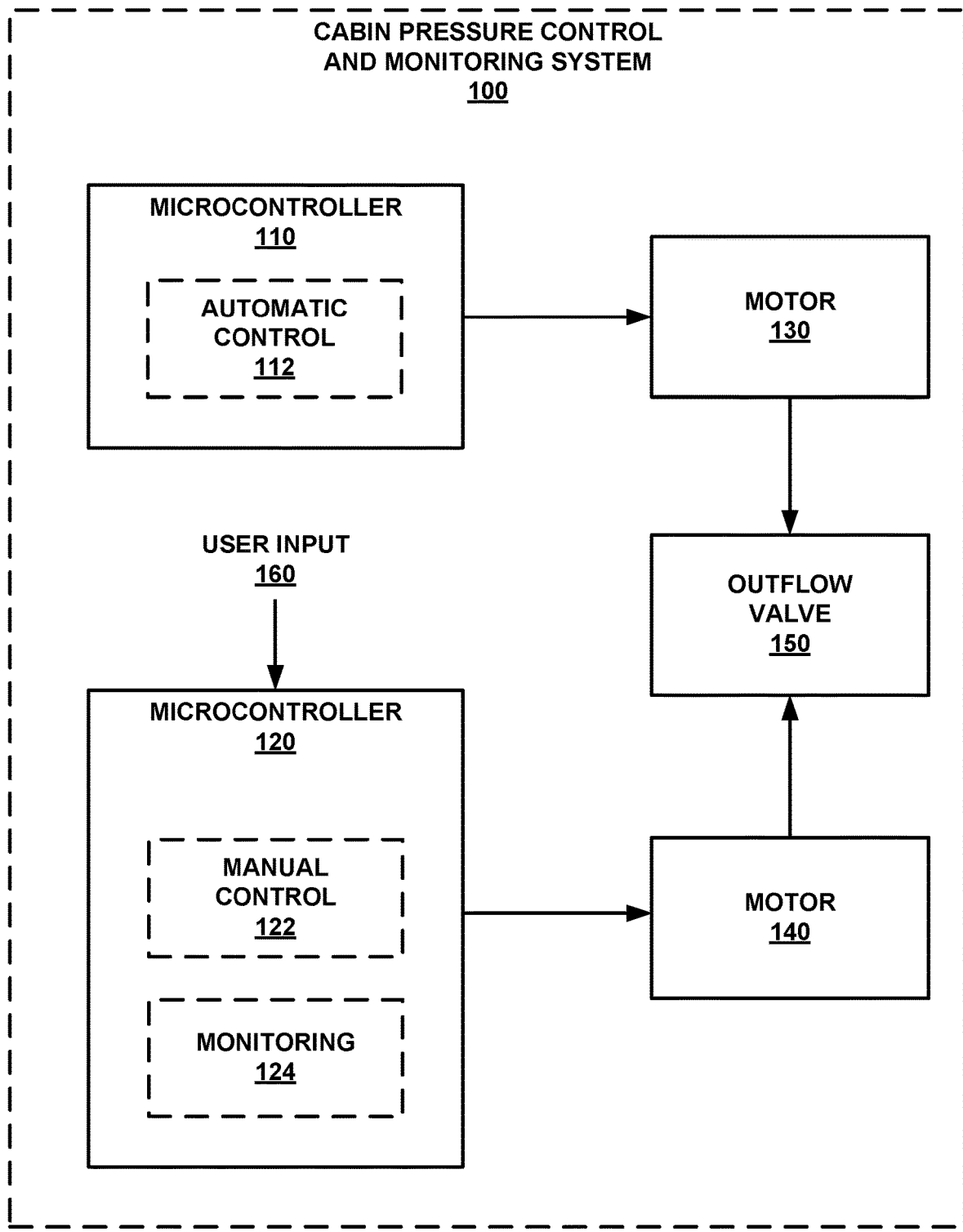
FIG. 1 is a conceptual block diagram of a cabin pressure control and monitoring system, in accordance with some examples of this disclosure.

FIG. 1 is a conceptual block diagram of a cabin pressure control and monitoring system 100, in accordance with some examples of this disclosure. Cabin pressure control and monitoring system 100 may be part of an aircraft such as an airplane, a helicopter, or a weather balloon. Alternatively, cabin pressure control and monitoring system 100 can be part of a space vehicle such as a satellite or spaceship.

Cabin pressure control and monitoring system 100 controls and monitors the pressure of a fluid in a cabin. The cabin may be the passenger compartment of a vehicle, such as the galley and/or cockpit of an aircraft, which is filled with air. Air pressure is related to air density, so human lungs must work harder at lower air pressures, as compared to higher air pressures, to ingest enough oxygen. Thus, for the occupants of the cabin, it is important to maintain a sufficiently high fluid pressure (e.g., air pressure). Although not shown in FIG. 1, cabin pressure control and monitoring system 100 can also include sensors for sensing the pressure of the fluid in the cabin, for sensing the atmospheric pressure outside of the cabin, and for sensing the position of outflow valve 150. Cabin pressure control and monitoring system 100 may also include an inflow valve for allowing fluid to flow in to the cabin.

Microcontroller 110, via automatic control module 112, automatically controls the pressure of the fluid in the cabin based on a sensed cabin pressure. Automatic control module 112 may operate with a closed feedback loop based on a feedback signal from a hall-effect motor rotor position sensor or from another type of sensor. Microcontroller 110 can receive a signal indicating the cabin pressure and determine whether to open or close outflow valve 150 based on the signal. Microcontroller 110 may be configured to deliver signals to a motor driver that controls the operation of first motor 130. Microcontroller 110 can also receive a pressure sensor signal indicating the pressure of the fluid and control motor 130 based on the pressure sensor signal. In examples in which the pressure sensor signal indicates that the cabin pressure is greater than an upper threshold, microcontroller 110 can control motor 130 to open outflow valve 150 to release fluid and lower the cabin pressure. In examples in which the pressure sensor signal indicates that the cabin pressure is less than a lower threshold, microcontroller 110 can control motor 130 to close outflow valve 150 to prevent the release of fluid from the cabin. Microcontroller 110 can also be coupled to an avionics system of the aircraft to receive control signals from the avionics system.

Microcontroller 120, via manual control module 122, controls the pressure of the fluid in the cabin based on user input 160. User input 160 can include flipping a switch, pressing a button or a key, turning a knob, and/or touching a screen. In some examples, cabin pressure control and monitoring system 100 may include a first switch that allows for a user to select an increased or decreased cabin pressure and a second switch that allows the user to select a dump operation. Microcontroller 120 can open or close outflow valve 150 based on the status of the first switch. Microcontroller 120 may open the outflow valve 150 in response to detecting that the user has flipped the second switch. Manual control module 122 may be configured to refrain from driving motor 140 in response to detecting that user input 160 does not indicate that the user selected manual operation.

Example details of automatic control and manual control of an outflow valve can be in commonly assigned U.S. Pat. No. 6,979,257 (issued on Dec. 27, 2005), commonly assigned U.S. Pat. No. 8,808,072 (issued on Aug. 19, 2014), and commonly assigned U.S. Pat. No. 8,864,559 (issued on Oct. 21, 2014), which are incorporated herein in their entireties.

Microcontroller 120, via monitoring module 124, monitors the cabin pressure. Monitoring module 124 can include altitude limit functionality to prevent the cabin altitude from exceeding a threshold level. For example, responsive to detecting that the cabin altitude has exceeded the threshold level, microcontroller 120 can cause motor 140 to close outflow valve 150 to prevent the release of fluid from the cabin.

Motors 130 and 140 are configured to control the position of outflow valve 150. Each of motors 130 and 140 may be able to open or close a flap within outflow valve 150. In some examples, motor 130 includes a brushless direct-current (BLDC) motor, and motor 140 includes a brushed direct-current (BDC) motor. However, either of motors 130 and 140 may include a BLDC motor or a BDC motor. In some examples, the smallest available BLDC motor circuit design may not be able to fit in the rotary actuator space without adding an additional small printed board assembly (PBA), so a BDC motor can be used instead. Each of motors 130 and 140 can control outflow valve 150 through a single, shared actuator or gearbox.

Outflow valve 150 can release fluid from the cabin based on the state of outflow valve 150. For example, outflow valve 150 can include a butterfly valve that can rotate to increase or decrease the fluid flow rate through outflow valve 150. Alternatively, outflow valve 150 may include a thrust recovery type valve, mounted on the fuselage skin, separating the fluid from the atmosphere pressure via two doors which are linked to, and controlled by a rotary actuator. Outflow valve 150 may be positioned within the bulkhead of an aircraft and may be in flow communication with the cabin air and the outside ambient atmosphere. A rotary position sensor near outflow valve 150 can sense the position of outflow valve 150 and deliver a signal to microcontroller 110 and/or 120.

Microcontroller 110 or 120 can fail during the operation of cabin pressure control and monitoring system 100. In examples in which only microcontroller 110 fails or only microcontroller 120 fails, then the operational microcontroller will still be able to maintain a safe cabin pressure. However, in examples in which both of microcontrollers 110 and 120 fail, there may not be a backup channel or a backup valve for releasing fluid from the cabin. When both of microcontrollers 110 and 120 fail, outflow valve 150 cannot be opened or closed during flight and post-landing situations. As a result, the cabin pressure may become undesirably high or undesirably low in a case where both of microcontrollers 110 and 120 are inoperable.

Microcontroller 110 or 120 may fail because of hardware or software issues. For example, the semiconductor materials in microcontroller 110 may have a defect, such as a manufacturing defect. As another example, the firmware or operating system of microcontroller 110 may have a bug that results in a failure of microcontroller 110 during the operation of cabin pressure control and monitoring system 100. In examples in which microcontrollers 110 and 120 are of the same type (e.g., the same manufacturer, the same model number, etc.), the chances that both of microcontrollers 110 and 120 fail at the same time may increase. If microcontrollers 110 and 120 are the same type of microcontroller, there is a higher chance of a common mode failure. Using the same microcontroller for both of microcontrollers 110 and 120 can effectively create a single point of failure.

In accordance with various aspects of this disclosure, a type of microcontroller 110 may be different than a type of microcontroller 120 to reduce the likelihood of a common failure for microcontrollers 110 and 120 for the same common reason, such as manufacturing process defect, an actual design defect, or from an external influence such as exposure to temperature, radiation, vibration, or power interrupts. The type of microcontroller 110 refers to the manufacturer, the model number, the design, the manufacturing facility, the software compiler, the operating system, pin count, logic family (e.g., complementary metal-oxide-semiconductor (CMOS) or transistor-transistor logic (TTL)), and/or the register size (e.g., eight or sixteen bits) of microcontroller 110. Thus, the manufacturer or brand name of microcontroller 110 may be different than the manufacturer or brand name of microcontroller 120. Additionally or alternatively, the operating system of microcontroller 110 may be different than the operating system of microcontroller 120. In some examples, microcontroller 110 can operate independently of microcontroller 120 so that if one of microcontrollers 110 and 120 fails, the remaining microcontroller can still control outflow valve 150. Independent operation can include microcontrollers 110 and 120 having separate power supplies, separate pressure sensors, separate circuit boards, and/or galvanic isolation between microcontrollers 110 and 120.

In some examples, microcontroller 120 receives a different power supply than microcontroller 110 to reduce the likelihood of a common failure for microcontrollers 110 and 120. Different power supplies for each of microcontrollers 110 and 120 can reduce the likelihood that both of microcontrollers 110 and 120 fail at the same time, for the same common reason, such as a manufacturing or design defect of the power supply electrical device itself, or a design implementation defect of the integrated electrical design, or an external influence such as temperature exposure. The power supplies may be independent of each other by, for example, using different power sources (e.g., different batteries or generators) and different aircraft supplied power buses.

Figure 2:
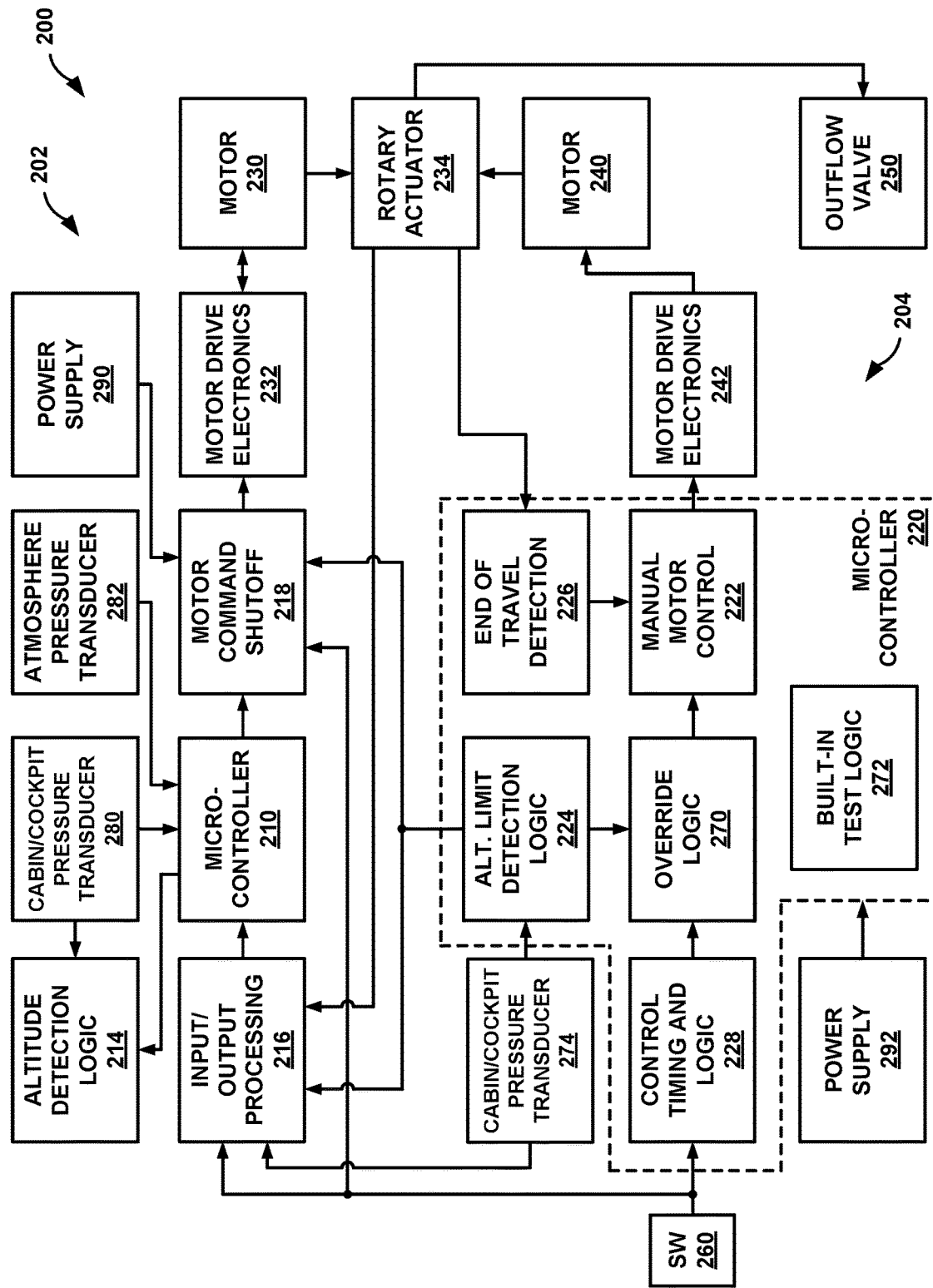
FIG. 2 is a conceptual block diagram showing additional details of a cabin pressure control and monitoring system, in accordance with some examples of this disclosure.

FIG. 2 is a conceptual block diagram showing additional details of a cabin pressure control and monitoring system 200, in accordance with some examples of this disclosure. Cabin pressure control and monitoring system 200 includes automatic cabin pressure subsystem 202 and manual cabin pressure subsystem 204. Automatic cabin pressure subsystem 202, through motor drive electronics 232, controls the operation of motor 230 to operate rotary actuator 234. Manual cabin pressure subsystem 204, through motor drive electronics 242, controls the operation of motor 240 to operate rotary actuator 234 using motor drive electronics 242. Motors 230 and 240 can operate outflow valve 250 through rotary actuator 234, which may include a planetary differential gear train.

High cabin altitude detection logic 214 receives signals from cockpit pressure transducer 280 and microcontroller 210 to determine whether to generate a high cabin altitude warning. Microcontroller 210 is configured to automatically control motor 230 based on an output of cockpit pressure transducer 280. Input/output processing 216 can receive an altitude limit signal from altitude limit detection logic 224, a position signal from rotary actuator 234, a user input signal from switches 260, a pressure signal from pressure transducer 274, and signals from discrete and analog input/outputs, a Controller Area Network (CAN) bus, and an Aeronautical Radio, Inc. (ARINC) 429 receiver. Input/output processing 216 can receive a signal via the CAN bus indicating a target speed for microcontroller 210 to drive motor 230. Input/output processing 216 can also receive information about the altitude of the aircraft from an air data computer. Microcontroller 210 can determine the pressure differential between the inside and outside of the cabin based on the signals received from pressure transducers 280 and 282.

Motor command shutoff 218 can shut off motor drive electronics 232 in response to receiving a signal indicating manual operation or altitude limit operation. Motor command shutoff 218 can also shut off motor drive electronics 232 in response to receiving a signal indicating that power is not adequate or the software has exceeded its real-time running allocation. Thus, manual operation and altitude limit operation and internal circuit monitors override automatic operation by microcontroller 210. End of travel detection 226 can shut off manual motor control 222 in response to detecting that the position of rotary actuator 234 indicates that outflow valve 250 has reached a fully open or fully closed state. Microcontroller 220 may be capable of communicating with an external valve position sensor. Microcontroller 220 can determine if outflow valve 250 has reached end-of-travel based on the position sensor signal. If microcontroller 220 is operating in manual control mode, and the open state or the close state is true, microcontroller 220 can control motor 240 and outflow valve 250 unless end of travel is detected for outflow valve 250 by block 226. If microcontroller 220 is operating in altitude limit mode, microcontroller 220 can control motor 240 to close outflow valve 250 unless end of travel detection 226 indicates a closed state.

Microcontroller 220 is configured to control motor 240 based on user input received from switches 260 and to monitor cabin pressure. Microcontroller 220 includes altitude limit detection logic 224 for detecting that the cabin pressure is less than an altitude limit threshold pressure and closing outflow valve 250 in response to detecting that the cabin pressure is less than the altitude limit threshold pressure. Altitude limit detection logic 224 can determine that the cabin altitude is greater than a threshold altitude (e.g., that the cabin pressure is less than a threshold pressure) based on a signal received by microcontroller 220 from pressure transducer 274. Pressure transducer 274 can also include a conditioning circuit.

Microcontroller 220 receives user input from switches 260. Using switches 260, a user can control the cabin pressure by controlling whether microcontroller 220 directly opens or closes outflow valve 250. For example, switches 260 may include a switch for selecting between automatic control by microcontroller 210 and manual control by microcontroller 220. Switches 260 may also include a switch that allows the user to select to directly command outflow valve 250 more closed or more open, causing an increase in pressure or a decrease in pressure. The user can use switches 260 to activate a dump function to open outflow valve 250 to dump or release the fluid in the cabin to the outside environment. A dump function can be used in an emergency, to release smoke or other fluid from the cabin, or when an aircraft has landed.

Microcontroller 220 includes override logic 270 for determining whether the altitude limit functionality should override the dump function or whether the dump function should override the altitude limit functionality. In some systems, the altitude limit function overrides the manual function and the dump function, thereby preventing an outflow valve from completely depressurizing the cabin when the cabin altitude is greater than the threshold. However, it may not always be desirable for the altitude limit to override the dump function. For example, an aircraft with a lower altitude certification may have a dump function that should not be overridden by the altitude limit function. As another example, it may be desirable to remove smoke from the cabin using the dump function, even if the cabin altitude is greater than the threshold. Without the techniques of this disclosure, it may be expensive to switch between the altitude limit functionality overriding the dump function and not overriding the dump function.

However, by using microcontroller 220 with override logic 270, rather than an analog circuit, for manual control and altitude limit functionality, microcontroller 220 can set the altitude limit functionality to override or not override the dump function based on user input received at switches 260. Switches 260 may include a switch that a user can flip to select between having the altitude limit functionality override the dump function or having the dump function override the altitude limit functionality. The switch may allow the user to set the override status to true to cause the altitude limit functionality to override the dump function or to false to cause the dump function to override the altitude limit functionality. Microcontroller 220 can receive an input signal (e.g., from switches 260 or from a software update), and override logic 270 can cause the altitude limit operation to override the dump operation in response to a first value of the input signal. Override logic 270 can cause the dump operation to override the altitude limit operation in response to a second value of the input signal.

When the altitude limit condition is true and the altitude limit override is false, microcontroller 220 can drive motor 240 at a predetermined speed for the duration of the condition or until outflow valve 250 is closed. The speed for the altitude limit condition can be selected through non-volatile memory or a digital potentiometer without changing hardware or software of microcontroller 220. When the altitude limit condition is false, or when the altitude limit condition is true and the altitude limit override is also true, microcontroller 220 may be configured to refrain from driving motor 240.

Built-in test logic 272 can test whether elements of cabin pressure control and monitoring system 200 are working properly. For example, using built-in test logic 272, microcontroller 220 may be configured to test altitude limit detection logic 224, pressure transducer 274, motor drive electronics 242, motor 240, and/or power supply 292. Built-in test logic 272 may be able to operate continuously during the operation of cabin pressure control and monitoring system 200. Built-in test logic 272 can output a fault indication to a user (e.g., a pilot) in response to detecting a fault in manual motor control 222, altitude limit detection logic 224, and/or control timing and logic 228. Without an output indicating the fault condition, a user would not know about the fault until the user switched to manual operation, which may be a rare occurrence (e.g., automatic control fault). The fault indication can inform the user about the fault even during automatic operation.

In some examples, such as when the aircraft is on the ground, microcontroller 210 can initiate a self-test by built-in test logic 272. Microcontroller 210 may be configured to transmit a signal to microcontroller 220 instructing microcontroller 220 to perform a test of one or more components of manual cabin pressure subsystem 204. For example, built-in test logic 272 can test power supply 292, pressure transducer 274 (e.g., a range of pressure transducer 274), or a mismatch between the inputs of pressure transducer 274. The mismatch can occur when an analog signal generated by pressure transducer 274 indicates that the pressure is less a threshold level but a digital signal generated by pressure transducer 274 indicates that the pressure is greater than the threshold level. Built-in test logic 272 can self-test microcontroller 220 or test another component of cabin pressure control and monitoring system 200 in response to receiving the signal. Built-in test logic 272 may then output an indication of a fault condition in response to detecting a fault during the self-testing.

Built-in test logic 272 may be configured to test the voltage tolerances for power supply 292. If pressure transducer 274 generates a discrete signal indicating an altitude limit condition, built-in test logic 272 can check whether the analog signal generated by pressure transducer 274 is greater than a threshold level during a predetermined time period, such as ten or twenty seconds. Responsive to determining that the analog signal is greater than the threshold level during the predetermined time period, built-in test logic 272 can set the altitude limit condition to false and generate a fault signal. If pressure transducer 274 generates a discrete signal indicating that no altitude limit condition exists, built-in test logic 272 can check whether the analog signal generated by pressure transducer 274 is greater than a threshold level during the predetermined time period. Responsive to determining that the analog signal is greater than the threshold level during the predetermined time period, built-in test logic 272 can set the altitude limit condition to false and generate a fault signal. Responsive to determining that the analog signal generated by pressure transducer 274 is outside of a valid range, built-in test logic 272 can set the altitude limit condition to false and generate a fault signal.

Another system may include an analog circuit with discrete components, rather than a microcontroller, for manual control and altitude limiting functionality. The analog circuit does not have built-in test functionality for identifying whether the analog circuit is healthy. Thus, the analog circuit can have a latent failure and be unavailable (e.g., after an automatic control channel failure), which can result in the outflow valve not being controlled in flight or post-landing. A failure of the analog circuit, which can go undetected without built-in test logic, can result in an erroneous pressure sensor reading and an erroneous altitude limit condition, overriding the automatic control by driving a motor to close the outflow valve. An erroneous altitude limit condition means the loss of automatic control and manual control functionality. To reduce the likelihood of erroneous altitude limit operation, built-in test logic 272 can generate an indication of a fault in response to detecting a failure of altitude limit detection logic 224. Microcontroller 220 can also generate a discrete signal that is an indication that the altitude limit condition is actively closing outflow valve 250. When the altitude limit condition is actively closing outflow valve 250, the discrete signal can notify automatic cabin pressure subsystem 202 to notify the pilot for better situational awareness.

Power supply 290 delivers electrical power to microcontroller 210 and motor command shutoff 218 of automatic cabin pressure subsystem 202. Power supply 292 delivers electrical power to microcontroller 220 of manual cabin pressure subsystem 204. In some examples, each of power supplies 290 and 292 include a 28-volt DC power supply. However, power supply 290 may be a separate from power supply 292. Moreover, a type of the power electronics circuit for power supply 290 may be different than a type of the power electronics circuit for power supply 292. For example, the designs, manufacturers, or brands of the power electronics circuits for power supplies 290 and 292 may be dissimilar. The power electronics circuit for power supplies 290 and 292 may, for example, step down the aircraft power input sourced supply voltage from 28 volts to three or five volts for microcontrollers 210 and 220. Microcontroller 220 may also have an aircraft power input source with a battery for a backup power supply.

Microcontrollers 210 and 220 may also be mounted on different circuit boards with separate pressure transducers 274 and 280 and separate motor drive electronics 232 and 242. Pressure transducer 280, power supply 290, and motor drive electronics 232 may be mounted on the same circuit board as microcontroller 210. Pressure transducer 274, power supply 292, and motor drive electronics 242 may be mounted on the same circuit board as microcontroller 220.

In some examples, power supply 292 does not provide power to motor drive electronics 242 unless the altitude limit function is true or active or the manual mode is true or active. The capability and limit of motor drive electronics 242 may be 1.5 amperes (zero-to-peak) to protect the gears and stops of rotary actuator 234. Manual motor control 222 can attenuate current peaks that exceed a threshold within a fifty micro-seconds (PWM control at twenty kilohertz) or some other amount of time.

Motor drive electronics 232 and 242 can include power converters that receive control signals from microcontrollers 210 and 220 and drive the coils of motors 230 and 240 based on the control signals. Motor drive electronics 232 may be separate and dissimilar from motor drive electronics 242 to reduce the likelihood that both motor drive electronics 232 and 242 fail at the same time. For example, the type, brand, design, and other characteristics of motor drive electronics 232 may be different than the type, brand, design, and other characteristics of motor drive electronics 242.

For BLDC motors, microcontrollers 210 and/or 220 may be configured to read a Hall-effect, or another feedback device, sensor to determine speed and rotor position. The duration of the speed command may be greater for manual control, which gives the system time for adequate Hall feedback to detect the actual speed. Microcontrollers 210 and 220 can control motors 230 and 240 to achieve target speeds and directions, which can be programmable in memory. BDC motors can use fixed PWM signals, resulting in fixed voltages, to achieve the target speeds without closed-loop speed commands, motor speed feedback, or rotor position feedback.

Some systems that drive a manual motor using a DC power supply may lack the ability to control the speed of the manual motor. The motor may operate at a speed resulting from the DC input power, which may be too fast or too slow for operating in manual control or altitude limit control. The motor speed in some systems is not adaptable to different sizes of aircraft without changing the motor or the gear train reduction ratio. For example, using the same cabin pressure control and monitoring system, including the motors and actuator gear train, for a large-volume pressurized cabin and a small-volume pressurized cabin. For a small-volume pressurized cabin, a motor response that is too fast or too slow can result in pressurization rates that are too fast or too slow when a user selects manual control or ineffective altitude limiting controls in the event of a depressurization.

Microcontroller 220 may be configured to use different speeds for different conditions, such as manual control, dump operations, and altitude limit operations. To use different speeds, microcontroller 220 can cause motor drive electronics 242 to control the speed of motor 240. Microcontroller 220 can use slow-then-fast speeds depending on the duration of the manual control condition, the duration of the dump operation, and the duration of the altitude limit condition. Microcontroller 220 can also use programmable control speeds for the manual functions (e.g., manual control, altitude limit, and dump) depending on the cabin volume. For example, microcontroller 220 can store coefficients for each function to a non-volatile memory (not shown in FIG. 2), where each coefficient represents a relative speed for the respective function. A software or firmware update for microcontroller 220 can change the values of the stored coefficients.

Microcontroller 220, through manual motor control 222, may be configured to cause motor drive electronics 242 to drive motor 240 at a first speed greater than zero. For example, microcontroller 220 can drive motor 240 at the first speed for manual operation. In addition, microcontroller 220 may be configured to cause motor drive electronics 242 to drive motor 240 at a second, different speed greater than zero for altitude limit operation. In some examples, microcontroller 220 can control the speed of motor 240 with a slow speed at the beginning of a manual operation or an altitude limit operation. After a predetermined duration for the operation (e.g., four, six, or ten seconds), microcontroller 220 can increase the speed of motor 240. Microcontroller 220 can control motor 240 at the second speed for the remainder of the duration of the operating mode or until outflow valve 250 is fully open or fully closed. "Fully open" and "fully closed" refer to the bounds on the motion of outflow valve 250. Thus, microcontroller 220 can drive motor 240 at a first speed in response to sensing user input 260 and then drive motor 240 at a different speed in response to sensing user input 260 for more than a predetermined duration. The first and second speed can be selected through non-volatile memory or a digital potentiometer without changing hardware or software of microcontroller 220.

Figure 3:
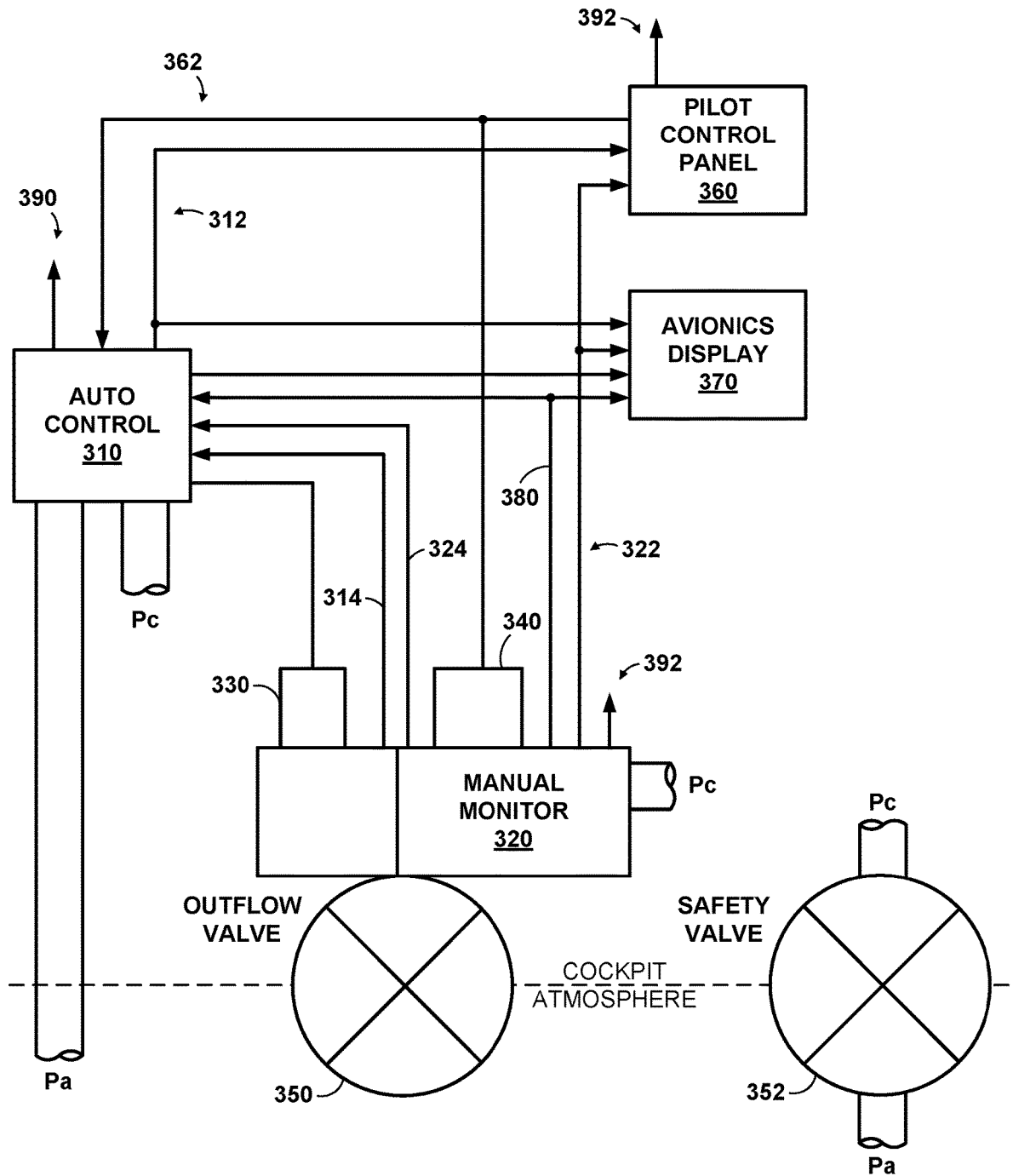
FIG. 3 is a conceptual block diagram of the system architecture of a cabin pressure control and monitoring system, in accordance with some examples of this disclosure.

FIG. 3 is a conceptual block diagram of the system architecture of a cabin pressure control and monitoring system 300, in accordance with some examples of this disclosure. Cabin pressure control and monitoring system 300 includes microcontrollers 310 and 320, motors 330 and 340, outflow valves 350 and 352, pilot control panel 360, and avionics display 370, and safety valve 352.

Microcontroller 310 receives power from power supply 390, which may be separate from power supply 392 for microcontroller 320 and pilot control panel 360. Microcontroller 310 also receives manual operation signal 362 from pilot control panel 360, position signal 314 from the rotor actuator that drives outflow valve 350, and altitude limit signal 324 and sensed pressure signal 380 from microcontroller 320. Microcontroller 310 can output fault signal 312 to pilot control panel 360 and avionics display 370 in response to detecting a fault in microcontroller 310 or motor 330. Microcontroller 310 may receive signals indicating the cabin pressure (labeled "Pc") and the atmospheric pressure (labeled "Pa"). Microcontroller 310 can also control outflow valve 350 through motor 330.

Microcontroller 320 receives aircraft sourced power input to power supply 392, which may be the same aircraft sourced power input received by pilot control panel 360, and manual operation signal 362 from pilot control panel 360. Microcontroller 320 can output fault signal 322 to pilot control panel 360 and/or avionics display 370 in response to detecting a fault in microcontroller 320 or motor 340. Microcontroller 320 may receive a signal indicating the cabin pressure (labeled "Pc") and can control outflow valve 350 through motor 340.

In some examples, pilot control panel 360 includes three switches for receiving user input from a pilot or crewmember. The first switch allows a user to toggle between automatic control and manual control of outflow valve 350. The second switch is an up/down switch that allows the user to directly command outflow valve 350 position more closed or more open to cause an increase or decrease the cabin pressure. Microcontroller 320 may be configured to control motor 340 based on the setting of the second switch only when the first switch is set to manual control. The third switch allows the user to initiate a dump operation to open outflow valve 350 to dump the fluid in the cabin into the atmosphere.

Figure 4:
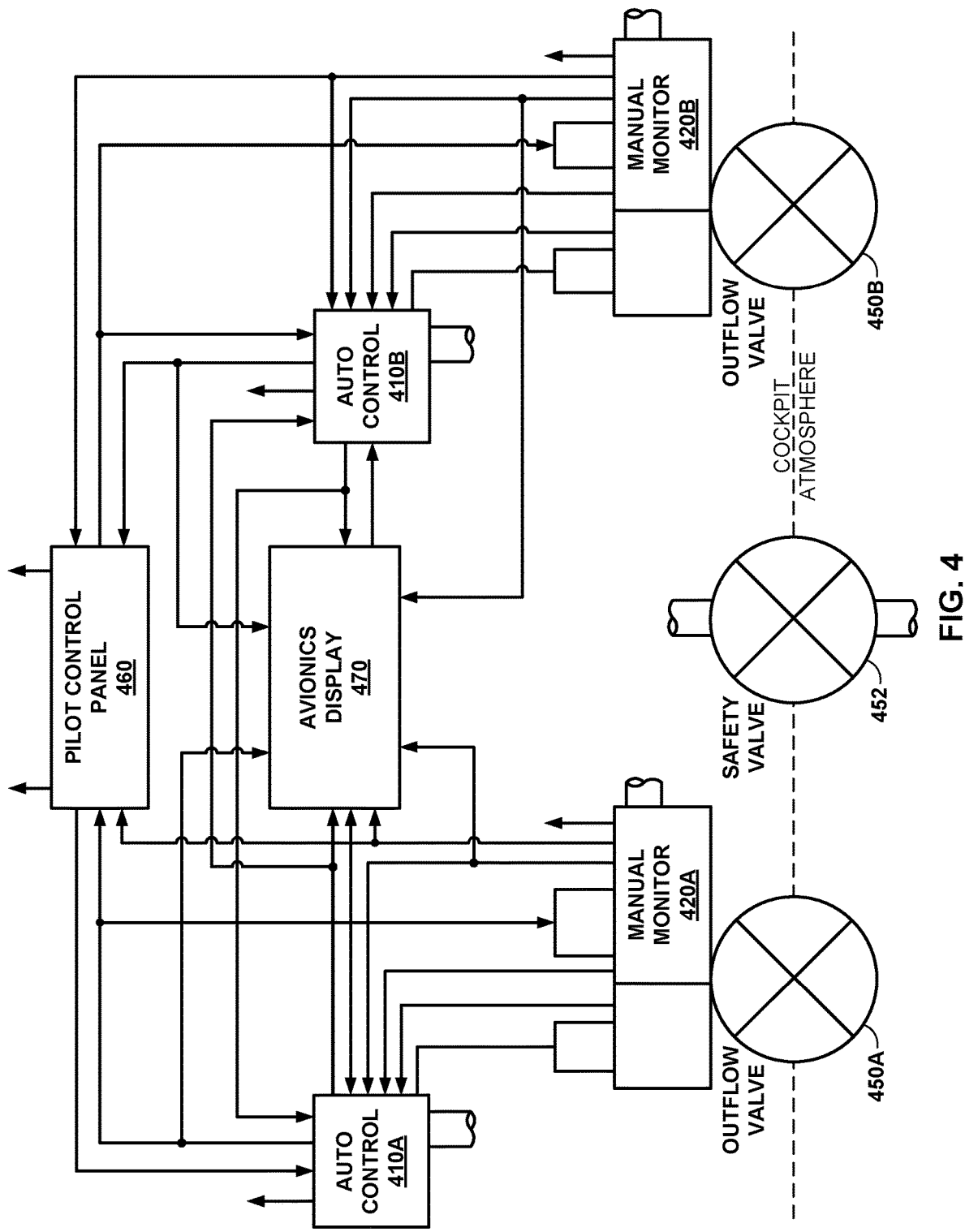
FIG. 4 is a conceptual block diagram showing of a two-valve implementation of a cabin pressure control and monitoring system, in accordance with some examples of this disclosure.

FIG. 4 is a conceptual block diagram showing of a two-valve implementation of a cabin pressure control and monitoring system 400, in accordance with some examples of this disclosure. Cabin pressure control and monitoring system 400 includes two outflow valves 450A and 450B to release fluid from two areas in a cabin. For example, an aircraft may have a first outflow valve positioned near the restroom at the front of the aircraft and a second outflow valve positioned near the restroom at the back of the aircraft. Cabin pressure control and monitoring system 400 also includes safety valve 452 to provide one more option for releasing fluid from the cabin.

Similar to the components of cabin pressure control and monitoring system 300 shown in FIG. 3, microcontrollers 410A and 410B receives a manual operation signal from pilot control panel 460. Microcontrollers 410A and 410B can output fault signals to pilot control panel 460 and avionics display 470 in response to detecting a fault in microcontroller 410A or 410B or a motor. In addition, microcontrollers 420A and 420B can output a fault signal to pilot control panel 460 and/or avionics display 470 in response to detecting a fault in a microcontroller or a motor. Microcontrollers 410A and 420A can control outflow valve 450A, and microcontrollers 410B and 420B can control outflow valve 450B.

Figure 5:
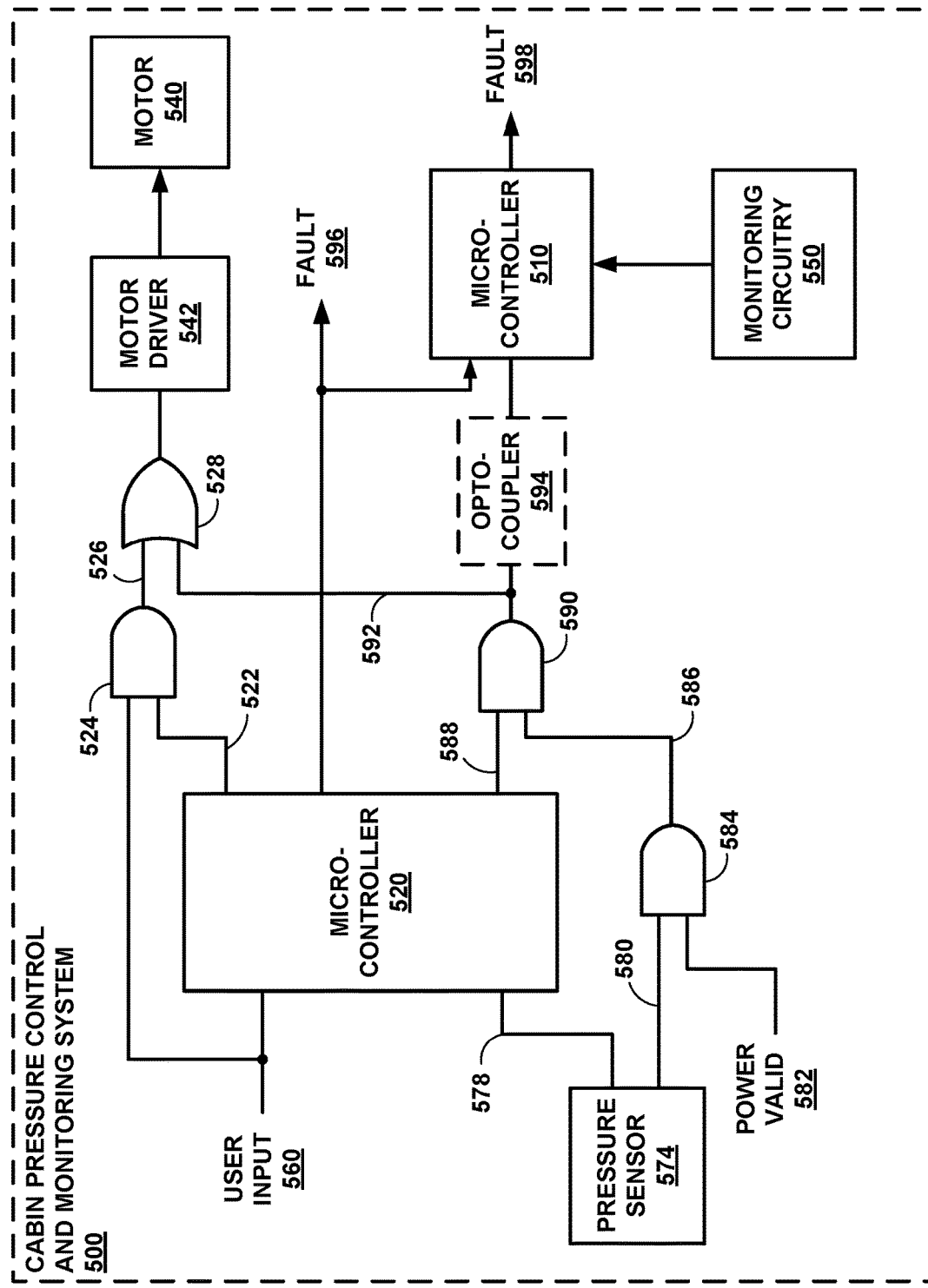
FIG. 5 is a circuit and conceptual block diagram of the input and output signals for two microcontrollers of a cabin pressure control and monitoring system, in accordance with some examples of this disclosure.

FIG. 5 is a circuit and conceptual block diagram of the input and output signals for two microcontrollers 510 and 520 of a cabin pressure control and monitoring system 500, in accordance with some examples of this disclosure. As shown in the example of FIG. 5, cabin pressure control and monitoring system 500 has the ability to AND the software-detected altitude limit output and the hardware-generated altitude limit output. This AND operation can improve erroneous altitude limit conditions that close the outflow valve. Microcontroller 520 may have only one power input, rather than using a manual input for a second power source. Microcontroller 520 can also generate a fault indication in response to detecting that the manual or altitude limit functionality has failed. Microcontroller 520 can perform a built-in test on the validity of pressure signals 578 and hardware generated altitude limit output 580. Microcontroller 520 can determine a fault condition by detecting that signal 578 is out of range (e.g., is less than the altitude-limit threshold). Responsive to determining the fault condition, microcontroller 520 can set software-detected altitude limit signal 588 to an inactive or false state and output fault signal 596 separate from signal 588. Microcontroller 520 can deliver the fault signal 596 to microcontroller 510.

In some examples, microcontroller 520 may include logic and timers for motor control or end-of-travel window comparators using position sensor inputs. Microcontroller 520 may have a modifiable altitude-limit setpoint and a modifiable motor speed for manual operation and altitude-limit operations. The software logic for microcontroller 520 may be very simple, and motor driver 542 can use synchronous pulse-width modulated timing to drive motor 540, which may include a brushless DC motor.

In some examples, microcontroller 520 cannot cause motor driver 542 to drive motor 540 unless the altitude limit is tripped or user input 560 indicates a user has flipped a manual switch. In other words, microcontroller 520 may be configured to refrain from causing motor driver 542 to drive motor 540 in response to detecting that user input 560 does not indicate manual operation and in response to determining that the altitude limit has not been tripped by logic gate 590. As described herein, the altitude limit is tripped within microcontroller 520 when microcontroller 520 determines that the cabin pressure is less than a threshold level. User input 560 can indicate manual operation when a user presses a button, flips a switch, or turns a knob to activate manual operation.

Motor driver 542 may be configured to drive motor 540 in response to the output of logic gate 528 having a true value (e.g., a high voltage level). When user input 560 indicates that the user has requested manual operation, microcontroller 520 receives a signal from user input 560 indicating that manual operation has been selected. Microcontroller 520 outputs signal 522 with a true value in response to determining that user input 560 indicates manual operation has been selected. Logic gate 524 generates a true value when user input 560 and signal 522 indicate that manual operation has been selected. Thus, logic gate 524 provides a check for the manual operation detection inside microcontroller 520. Logic gate 528 generates a true value to activate motor driver 542 either when signal 526 indicates manual operation has been selected or when signal 592 indicates an altitude limit condition.

Monitoring circuitry 550 is separate from microcontrollers 510 and 520. Monitoring circuitry 550 can detect a fault in microcontroller 510 or the motor controlled by microcontroller 510. In response to detecting the fault, monitoring circuitry 550 can transmit a signal to microcontroller 510 indicating that monitoring circuitry 550 detected the fault. Microcontroller 510 can also perform a self-test to detect a fault in microcontroller 510 or in the motor controlled by microcontroller 510. If microcontroller 510 detects a fault and receives a signal from monitoring circuitry 550 indicating that a fault was detected, microcontroller 510 can output an indication of the fault condition, shown as fault signal 598, to disable microcontroller 510 and the motor controlled by microcontroller 510.

Pressure sensor 574 is configured to output signal 578 indicating the sensed cabin pressure and signal 580 indicating whether the cabin pressure is less than a threshold level. Signal 578 may be analog signal that is output to microcontroller 520 as well as to other components in cabin pressure control and monitoring system 500. Pressure sensor 574 may be configured to refrain from transmitting signal 578 if power valid 582 is indicating a loss of power. Microcontroller 520 can use an analog-to-digital converter to convert signal 578 to a digital signal.

Pressure sensor 574 can output signal 580 with a true value (e.g., a high voltage level) in response to sensing that the cabin pressure is less than a threshold level or that the cabin altitude is greater than a threshold level. Logic gate 584 receives output signal 580 and power valid signal 582, which indicates whether the power supply for microcontroller 520 and the pressure sensor 574 is operating properly. Logic gate 584 disables the discrete output signal 580 of pressure sensor 574, unless power valid signal 582 is true. Logic gate 584 generates output signal 586 with a true value based on the values of signals 580 and 582. Microcontroller 520 also receives signal 578 from pressure sensor 574, where signal 578 indicates the cabin pressure. Microcontroller 520 determines whether the cabin pressure is less than a threshold level based on signal 578.

To prevent erroneous automatic control during the altitude limit condition, microcontroller 510 receives a signal from logic gate 590. Logic gate 590 can output a signal indicating the altitude limit condition only when both inputs to logic gate 590 indicate an altitude limit condition. Logic gate 590 performs a comparison between the analog-based, software-based input (signal 588) and the digital or discrete input (signal 586) generated by pressure sensor 574 and logic gate 584. Signal 588 is based on the analog signal 578 generated by pressure sensor 574, which microcontroller 520 uses to generate digital signal 588. Microcontroller 520 generates signal 588 with a digital value indicating whether the cabin pressure is less than a threshold level. Logic gate 590 ensures that the altitude limit operation is triggered only when both of microcontroller 520 and pressure sensor 574 detect that the cabin pressure is less than the threshold level. Thus, in the example shown in FIG. 5, both hardware and software have to confirm that the altitude limit has been tripped before logic gate 590 outputs signal 592 to activate altitude limit operation.

Logic gate 590 can perform an AND operation on the output of a discrete pressure sensor altitude limit condition (e.g., signals 580 and 586) and the computed microcontroller output (e.g., signal 588). Thus, logic gate 590 ensures that microcontroller 520 is not a single point of failure for the erroneous activation of the altitude limit condition. Logic gate 590 also ensures that signal 580 is not a single point of failure for the erroneous activation of the altitude limit condition because microcontroller 520 also uses the analog output of pressure sensor 574 (e.g., signal 578) to determine whether to trigger the altitude limit condition.

Logic gate 590 outputs signal 592 to logic gate 528 and to microcontroller 510. Cabin pressure control and monitoring system 500 may include opto-coupler 594 for galvanic isolation between microcontrollers 510 and 520. Microcontrollers 510 and 520 can operate independently of each other by having a galvanic isolation barrier, separate pressure sensors, separate circuit boards, and/or separate power supplies.

Figure 6:
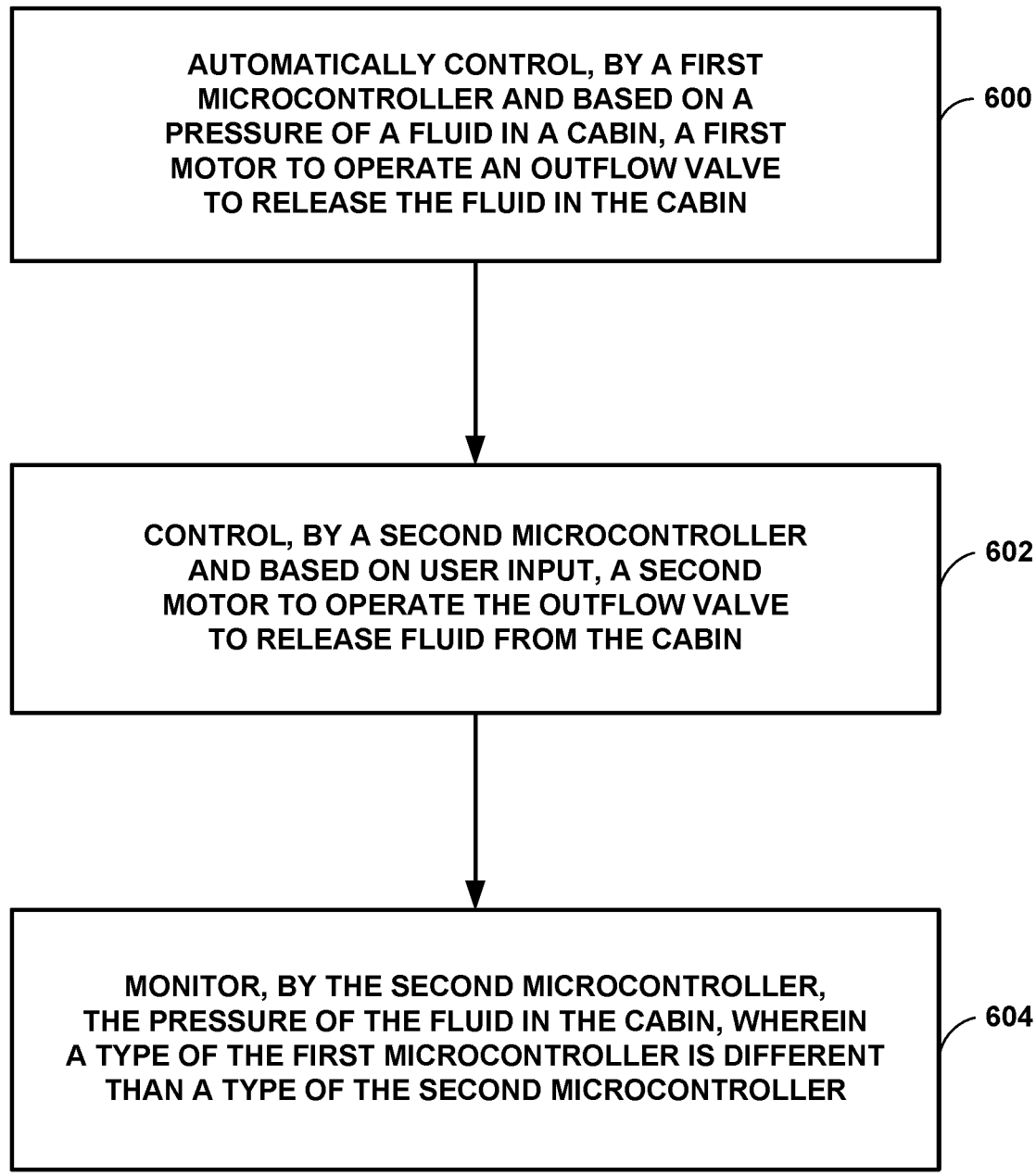
FIG. 6 is a flowchart illustrating an example process for controlling cabin pressure, in accordance with some examples of this disclosure.

FIG. 6 is a flowchart illustrating an example process for controlling cabin pressure, in accordance with some examples of this disclosure. The example process of FIG. 6 is described with reference to microcontrollers 110 and 120 shown in FIG. 1, although other components may exemplify similar techniques.

In the example of FIG. 6, microcontroller 110 automatically controls motor 130 based on a pressure of a fluid in a cabin to operate outflow valve 150 to release the fluid in the cabin (600). Automatic control module 112 can operate a closed feedback loop to control outflow valve 150 based on the sensed cabin pressure. Automatic control module 112 may control motor 130 using the sensed cabin pressure and a target cabin pressure or a target cabin altitude.

In the example of FIG. 6, microcontroller 120 controls motor 140 based on user input 160 to operate outflow valve 150 to release fluid from the cabin (602). Microcontroller 120 can open or close outflow valve 150 based on user input 160. When a user selects manual operation, microcontroller 120 can command microcontroller 110 to cease control of motor 130. Manual control module 122 can cause motor 140 to open or close outflow valve 150 based on whether the user selects to directly close or open outflow valve 150, causing an increase or decrease in cabin pressure.

In the example of FIG. 6, microcontroller 120 monitors the pressure of the fluid in the cabin (604). Monitoring module 124 can monitor the cabin pressure by receiving a signal from a pressure sensor. Microcontroller 120 may include altitude limit functionality, which includes determining whether the cabin pressure is less than a threshold level. In response to determining that the cabin pressure is less than the threshold level (e.g., determining that the cabin altitude is greater than a threshold altitude), microcontroller 120 can close outflow valve 150 to increase the cabin pressure. When outflow valve 150 is closed, the cabin pressure can increase as fluid flows into the cabin from, for example, the bleed air of a turbine engine.

As described herein, a type of microcontroller 110 is different than a type of microcontroller 120. The type of each microcontroller may refer to the manufacturer, brand, and/or model number of the microcontroller. Using a different type of microcontroller for microcontrollers 110 and 120 can remove a single point of failure for cabin pressure control and monitoring system 100. In addition, using different power supplies and circuit boards for microcontrollers 110 and 120 further reduces the possibility of a dual failure for microcontrollers 110 and 120.

The following numbered examples demonstrate one or more aspects of the disclosure.

Example 1. A cabin pressure control and monitoring system includes an outflow valve, a first motor configured to operate the outflow valve to release fluid from a cabin, and a second motor configured to operate the outflow valve to release fluid from the cabin. The cabin pressure control and monitoring system also includes a first microcontroller configured to automatically control the first motor based on a pressure of the fluid in the cabin. The cabin pressure control and monitoring system further includes a second microcontroller configured to control the second motor based on user input and monitor the pressure of the fluid in the cabin. In some examples, a type of the first microcontroller is different than a type of the second microcontroller.

Example 2. The cabin pressure control and monitoring system of example 1, a design of the first microcontroller is different than a design of the second microcontroller.

Example 3. The cabin pressure control and monitoring system of examples 1-2 or any combination thereof, the first microcontroller operates independently of the second microcontroller.

Example 4. The cabin pressure control and monitoring system of examples 1-3 or any combination thereof, a model number of the first microcontroller is different than a model number of the second microcontroller.

Example 5. The cabin pressure control and monitoring system of examples 1-4 or any combination thereof, an operating system of the first microcontroller is different than an operating system of the second microcontroller.

Example 6. The cabin pressure control and monitoring system of examples 1-5 or any combination thereof, a manufacturer of the first microcontroller is different than a manufacturer of the second microcontroller.

Example 7. The cabin pressure control and monitoring system of examples 1-6 or any combination thereof, a register size of the first microcontroller is different than a manufacturer of the second microcontroller.

Example 8. The cabin pressure control and monitoring system of examples 1-7 or any combination thereof, a brand name of the first microcontroller is different than a brand name of the second microcontroller.

Example 9. The cabin pressure control and monitoring system of examples 1-8 or any combination thereof, the first microcontroller is configured to transmit a signal to the second microcontroller, and the second microcontroller is configured to self-test the second microcontroller in response to receiving the signal.

Example 10. The cabin pressure control and monitoring system of examples 1-9 or any combination thereof, the second microcontroller is configured to output an indication of a fault condition in response to self-testing the second microcontroller.

Example 11. The cabin pressure control and monitoring system of examples 1-10 or any combination thereof, the second microcontroller is configured to self-test the second microcontroller by testing a power supply of the second microcontroller, a range of a pressure sensor, or a mismatch between inputs from the pressure sensor.

Example 12. The cabin pressure control and monitoring system of examples 1-11 or any combination thereof, further including monitoring circuitry separate from the first microcontroller and the second microcontroller, where the monitoring circuitry is configured to monitor the pressure of the fluid in the cabin.

Example 13. The cabin pressure control and monitoring system of examples 1-12 or any combination thereof, the first microcontroller is configured to detect a fault condition in the first microcontroller or the first motor and receive a signal from the monitoring circuitry indicating that the monitoring circuitry detected a fault condition in the first microcontroller or the first motor. The first microcontroller is also configured to output an indication of the fault condition to disable the first microcontroller and the first motor in response to detecting the fault condition and receiving the signal from the monitoring circuitry.

Example 14. The cabin pressure control and monitoring system of examples 1-13 or any combination thereof, the first microcontroller is configured to receive power from a first power supply, and the second microcontroller is configured to receive power from a second power supply, where the second power supply is different than the first power supply.

Example 15. The cabin pressure control and monitoring system of examples 1-14 or any combination thereof, the second microcontroller is configured to drive the second motor at a first speed greater than zero and drive the second motor at a second speed greater than zero, the second speed being different than the first speed.

Example 16. The cabin pressure control and monitoring system of examples 1-15 or any combination thereof, the second microcontroller is configured to drive the second motor at the first speed in response to sensing a user input and drive the second motor at the second speed in response to sensing the user input for more than a predetermined duration, where the second speed is faster than the first speed.

Example 17. The cabin pressure control and monitoring system of examples 1-16 or any combination thereof, the second microcontroller is configured to perform an altitude limit operation by closing the outflow valve in response to determining that the pressure of the fluid in the cabin is less than a threshold level.

Example 18. The cabin pressure control and monitoring system of examples 1-17 or any combination thereof, the second microcontroller is configured to perform a dump operation by opening the outflow valve in response to a user input.

Example 19. The cabin pressure control and monitoring system of examples 1-18 or any combination thereof, the second microcontroller is configured to receive an input signal and cause the altitude limit operation to override the dump operation in response to a first value of the input signal.

Example 20. The cabin pressure control and monitoring system of examples 1-19 or any combination thereof, the second microcontroller is configured to receive an input signal and cause the dump operation to override the altitude limit operation in response to a second value of the input signal.

Example 21. The cabin pressure control and monitoring system of examples 1-20 or any combination thereof, the second microcontroller is configured to receive the input signal from a memory device.

Example 22. The cabin pressure control and monitoring system of examples 1-21 or any combination thereof, further including a pressure sensor output a first signal indicating the pressure of the fluid in the cabin to the second microcontroller.

Example 23. The cabin pressure control and monitoring system of examples 1-22 or any combination thereof, the pressure sensor is configured to output a second signal indicating whether the pressure of the fluid in the cabin is less than a threshold level.

Example 24. The cabin pressure control and monitoring system of examples 1-23 or any combination thereof, the second microcontroller is configured to output, based on the first signal, a third signal indicating that whether the pressure of the fluid in the cabin is less than the threshold level. The second microcontroller is also configured to perform an altitude limit operation by closing the outflow valve in response to the second signal indicating that the pressure of the fluid in the cabin is less than the threshold level and the third signal indicating that the pressure of the fluid in the cabin is less than the threshold level.

Example 25. The cabin pressure control and monitoring system of examples 1-24 or any combination thereof, further including a first pressure sensor and a second pressure sensor separate from the first pressure sensor, where the first microcontroller is configured to automatically control the first motor based on an output of the first pressure sensor, and the second microcontroller is configured to monitor the pressure of the fluid in the cabin based on an output of the second pressure sensor.

Example 26. The cabin pressure control and monitoring system of examples 1-25 or any combination thereof, the second microcontroller is configured to output a signal indicating that an altitude limit operation is active.

Example 27. The cabin pressure control and monitoring system of examples 1-26 or any combination thereof, the outflow valve is a first outflow valve, and the cabin pressure control and monitoring system further includes a second outflow valve, a third motor configured to operate the second outflow valve to release fluid from the cabin, and a fourth motor configured to operate the second outflow valve to release fluid from the cabin.

Example 28. The cabin pressure control and monitoring system of examples 1-27 or any combination thereof, further including a third microcontroller configured to automatically control the third motor based on a pressure of the fluid in the cabin. The cabin pressure control and monitoring system also includes a fourth microcontroller configured to control the fourth motor based on user inputs and monitor the pressure of the fluid in the cabin. A type of the third microcontroller is different than a type of the fourth microcontroller.

Example 29. The cabin pressure control and monitoring system of examples 1-28 or any combination thereof, the second microcontroller is configured to detect that user input indicates manual operation and determine that the pressure of the fluid in the cabin is less than a threshold level. The second microcontroller is also configured to control the second motor in response to detecting that the user input indicates manual operation, cause the outflow valve to close in response to determining that the pressure of the fluid in the cabin is less than the threshold level, and refrain from controlling the second motor in response to detecting that the user input does not indicate manual operation and in response to determining that the pressure of the fluid in the cabin is not less than the threshold level.

Example 30. A method for controlling a pressure of a fluid in a cabin includes automatically controlling, by a first microcontroller and based on the pressure of the fluid in the cabin, a first motor to operate an outflow valve to release the fluid from the cabin. The method further includes controlling, by a second microcontroller and based on user input, a second motor to operate the outflow valve to release fluid from the cabin. The method also includes monitoring, by the second microcontroller, the pressure of the fluid in the cabin, where a type of the first microcontroller is different than a type of the second microcontroller.

Example 31. The method of example 30, a design of the first microcontroller is different than a design of the second microcontroller.

Example 32. The method of examples 30-31 or any combination thereof, the first microcontroller operates independently of the second microcontroller.

Example 33. The method of examples 30-32 or any combination thereof, a model number of the first microcontroller is different than a model number of the second microcontroller.

Example 34. The method of examples 30-33 or any combination thereof, an operating system of the first microcontroller is different than an operating system of the second microcontroller.

Example 35. The method of examples 30-34 or any combination thereof, a manufacturer of the first microcontroller is different than a manufacturer of the second microcontroller.

Example 36. The method of examples 30-35 or any combination thereof, a register size of the first microcontroller is different than a manufacturer of the second microcontroller.

Example 37. The method of examples 30-36 or any combination thereof, a brand name of the first microcontroller is different than a brand name of the second microcontroller.

Example 38. The method of examples 30-37 or any combination thereof, further including transmitting, by the first microcontroller, a signal to the second microcontroller, and self-testing, by the second microcontroller, the second microcontroller in response to receiving the signal.

Example 39. The method of examples 30-38 or any combination thereof, further including outputting, by the second microcontroller, an indication of a fault condition in response to self-testing the second microcontroller.

Example 40. The method of examples 30-39 or any combination thereof, further including self-testing, by the second microcontroller, the second microcontroller by testing a power supply of the second microcontroller, a range of a pressure sensor, or a mismatch between inputs from the pressure sensor.

Example 41. The method of examples 30-40 or any combination thereof, further including monitoring, by monitoring circuitry separate from the first microcontroller and the second microcontroller, the pressure of the fluid in the cabin.

Example 42. The method of examples 30-41 or any combination thereof, further including detecting, by the first microcontroller, a fault condition in the first microcontroller or the first motor. The method also includes receiving, by the first microcontroller, a signal from the monitoring circuitry indicating that the monitoring circuitry detected a fault condition in the first microcontroller or the first motor. The method further includes outputting, by the first microcontroller, an indication of the fault condition to disable the first microcontroller and the first motor in response to detecting the fault condition and receiving the signal from the monitoring circuitry.

Example 43. The method of examples 30-42 or any combination thereof, further including receiving, by the first microcontroller, power from a first power supply and receiving, by the second microcontroller, power from a second power supply, where the second power supply is different than the first power supply.

Example 44. The method of examples 30-43 or any combination thereof, further including driving, by the second microcontroller, the second motor at a first speed greater than zero and driving, by the second microcontroller, the second motor at a second speed greater than zero, the second speed being different than the first speed.

Example 45. The method of examples 30-44 or any combination thereof, further including, by the second microcontroller, the second motor at the first speed in response to sensing a user input and driving, by the second microcontroller, the second motor at the second speed in response to sensing the user input for more than a predetermined duration, where the second speed is faster than the first speed.

Example 46. The method of examples 30-45 or any combination thereof, further including performing, by the second microcontroller, an altitude limit operation by closing the outflow valve in response to determining that the pressure of the fluid in the cabin is less than a threshold level.

Example 47. The method of examples 30-46 or any combination thereof, further including performing, by the second microcontroller, a dump operation by opening the outflow valve in response to a user input.

Example 48. The method of examples 30-47 or any combination thereof, further including receiving, by the second microcontroller, an input signal and causing the altitude limit operation to override the dump operation in response to a first value of the input signal.

Example 49. The method of examples 30-48 or any combination thereof, further including receiving, by the second microcontroller, an input signal and causing the dump operation to override the altitude limit operation in response to a second value of the input signal.

Example 50. The method of examples 30-49 or any combination thereof, further including receiving, by the second microcontroller, the input signal from a memory device.

Example 51. The method of examples 30-50 or any combination thereof, further including outputting, by a pressure sensor, a first signal indicating the pressure of the fluid in the cabin to the second microcontroller.

Example 52. The method of examples 30-51 or any combination thereof, further including outputting, by the pressure sensor, a second signal indicating whether the pressure of the fluid in the cabin is less than a threshold level.

Example 53. The method of examples 30-52 or any combination thereof, further including outputting, by the second microcontroller and based on the first signal, a third signal indicating that whether the pressure of the fluid in the cabin is less than the threshold level. The method also includes performing, by the second microcontroller, an altitude limit operation by closing the outflow valve in response to the second signal indicating that the pressure of the fluid in the cabin is less than the threshold level and the third signal indicating that the pressure of the fluid in the cabin is less than the threshold level.

Example 54. The method of examples 30-53 or any combination thereof, further including outputting, by the second microcontroller, a signal indicating that an altitude limit operation is active.

Example 55. The method of examples 30-54 or any combination thereof, further including detecting, by the second microcontroller, that user input indicates manual operation and determining, by the second microcontroller, that the pressure of the fluid in the cabin is less than a threshold level. The method also includes controlling, by the second microcontroller, the second motor in response to detecting that the user input indicates manual operation, causing the outflow valve to close in response to determining that the pressure of the fluid in the cabin is less than the threshold level, and refraining from controlling the second motor in response to detecting that the user input does not indicate manual operation and in response to determining that the pressure of the fluid in the cabin is not less than the threshold level.

Example 56. A cabin pressure control and monitoring system includes an outflow valve, a first motor configured to operate the outflow valve to release fluid from a cabin, and a second motor configured to operate the outflow valve to release fluid from the cabin. The cabin pressure control and monitoring system also includes a first controller configured to automatically control the first motor based on a pressure of the fluid in the cabin. The cabin pressure control and monitoring system further includes a second controller configured to monitor the pressure of the fluid in the cabin, detect that user input indicates manual operation, and determine that the pressure of the fluid in the cabin is less than a threshold level. The second controller is also configured to control the second motor in response to detecting that the user input indicates manual operation, cause the outflow valve to close in response to determining that the pressure of the fluid in the cabin is less than the threshold level, and refrain from controlling the second motor in response to detecting that the user input does not indicate manual operation and in response to determining that the pressure of the fluid in the cabin is not less than the threshold level.

The disclosure contemplates computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, including those attributed to microcontrollers 110, 120, 210, 220, 510, and 520, modules 112, 122, and 124, motor drivers 232, 242, and 542, and various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between microcontrollers 110, 120, 210, 220, 510, and 520, modules 112, 122, and 124, and/or motor drivers 232, 242, and 542. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, microcontrollers 110, 120, 210, 220, 510, and 520, modules 112, 122, and 124, and/or motor drivers 232, 242, and 542, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A cabin pressure control and monitoring system comprising:
    an outflow valve;
    a first motor configured to operate the outflow valve to release fluid from a cabin;
    a second motor configured to operate the outflow valve to release fluid from the cabin;
    a first microcontroller configured to automatically control the first motor based on a pressure of the fluid in the cabin; and
    a second microcontroller configured to:
        drive the second motor at a first speed greater than zero in response to sensing a user input, and
        increase the second motor from the first speed to a second speed greater than zero in response to sensing the user input for more than a predetermined duration, wherein the second speed is faster than the first speed; and
    wherein a type of the first microcontroller is different than a type of the second microcontroller.

2. The cabin pressure control and monitoring system of claim 1,
    wherein a design of the first microcontroller is different than a design of the second microcontroller, and
    wherein the first microcontroller operates independently of the second microcontroller.

3. The cabin pressure control and monitoring system of claim 1, further comprising monitoring circuitry separate from the first microcontroller and the second microcontroller,
    wherein the monitoring circuitry is configured to monitor the pressure of the fluid in the cabin, and
    wherein the first microcontroller is further configured to:
        detect a fault condition in the first microcontroller or the first motor;
        receive a signal from the monitoring circuitry indicating that the monitoring circuitry detected a fault condition in the first microcontroller or the first motor; and
        output an indication of the fault condition to disable the first microcontroller and the first motor in response to detecting the fault condition and receiving the signal from the monitoring circuitry.

4. The cabin pressure control and monitoring system of claim 1,
    wherein the first microcontroller is configured to receive power from a first power supply, and
    wherein the second microcontroller is configured to receive power from a second power supply, the second power supply being different than the first power supply.

5. The cabin pressure control and monitoring system of claim 1, wherein the second microcontroller is configured to output a signal indicating that an altitude limit operation is active.

6. The cabin pressure control and monitoring system of claim 1, wherein the outflow valve is a first outflow valve, the cabin pressure control and monitoring system further comprising:
    a second outflow valve;
    a third motor configured to operate the second outflow valve to release fluid from the cabin;
    a fourth motor configured to operate the second outflow valve to release fluid from the cabin;
    a third microcontroller configured to automatically control the third motor based on a pressure of the fluid in the cabin; and
    a second microcontroller configured to:
        control the fourth motor based on user inputs; and
        monitor the pressure of the fluid in the cabin,
    wherein a type of the third microcontroller is different than a type of the fourth microcontroller.

7. A method for controlling a pressure of a fluid in a cabin, the method comprising:
    automatically controlling, by a first microcontroller and based on the pressure of the fluid in the cabin, a first motor to operate an outflow valve to release the fluid from the cabin;
    controlling, by a second microcontroller and based on a user input, a second motor to operate the outflow valve to release fluid from the cabin, wherein controlling the second motor comprises:
        driving the second motor at a first speed greater than zero in response to sensing the user input, and
        increasing the second motor from the first speed to a second speed greater than zero in response to sensing the user input for more than a predetermined duration, wherein the second speed is faster than the first speed; and
    monitoring, by the second microcontroller, the pressure of the fluid in the cabin, wherein a type of the first microcontroller is different than a type of the second microcontroller.

8. The method of claim 7,
wherein a design of the first microcontroller is different than a design of the second microcontroller, and
wherein the first microcontroller operates independently of the second microcontroller.

9. The method of claim 7, further comprising:
transmitting, by the first microcontroller, a signal to the second microcontroller;
self-testing, by the second microcontroller, the second microcontroller in response to receiving the signal; and
outputting, by the second microcontroller, an indication of a fault condition in response to self-testing the second microcontroller.

10. The method of claim 7, further comprising:
monitoring, by monitoring circuitry separate from the first microcontroller and the second microcontroller, the pressure of the fluid in the cabin, and
detecting, by the first microcontroller, a fault condition in the first microcontroller or the first motor;
receiving, by the first microcontroller, a signal from the monitoring circuitry indicating that the monitoring circuitry detected a fault condition in the first microcontroller or the first motor; and
outputting, by the first microcontroller, an indication of the fault condition to disable the first microcontroller and the first motor in response to detecting the fault condition and receiving the signal from the monitoring circuitry.

11. The method of claim 7,
performing, by the second microcontroller, an altitude limit operation by closing the outflow valve in response to determining that the pressure of the fluid in the cabin is less than a threshold level;
performing, by the second microcontroller, a dump operation by opening the outflow valve in response to a user input;
receiving, by the second microcontroller, an input signal;
causing, by the second microcontroller, the altitude limit operation to override the dump operation in response to a first value of the input signal; and
causing, by the second microcontroller, the dump operation to override the altitude limit operation in response to a second value of the input signal.

* * * * *